(12) United States Patent
Zink et al.

(10) Patent No.: US 10,026,217 B2
(45) Date of Patent: Jul. 17, 2018

(54) METHOD FOR REPRESENTING A PLURALITY OF IMAGE SEQUENCES

(75) Inventors: Armin Zink, Overath (DE); Bernd Frohlich, Hannover (DE)

(73) Assignee: Bauhaus Universität Weimar, Weimar (DE)

( * ) Notice: Subject to any disclaimer, the term of this patent is extended or adjusted under 35 U.S.C. 154(b) by 71 days.

(21) Appl. No.: 13/819,660

(22) PCT Filed: Aug. 29, 2011

(86) PCT No.: PCT/EP2011/064830
§ 371 (c)(1),
(2), (4) Date: Feb. 27, 2013

(87) PCT Pub. No.: WO2012/028586
PCT Pub. Date: Mar. 8, 2012

(65) Prior Publication Data
US 2013/0169637 A1 Jul. 4, 2013

(30) Foreign Application Priority Data
Aug. 31, 2010 (DE) .................. 10 2010 037 256

(51) Int. Cl.
*G06T 15/20* (2011.01)
*H04N 13/04* (2006.01)

(52) U.S. Cl.
CPC .......... *G06T 15/205* (2013.01); *H04N 13/045* (2013.01); *H04N 13/0422* (2013.01);
(Continued)

(58) Field of Classification Search
CPC combination set(s) only.
See application file for complete search history.

(56) References Cited

U.S. PATENT DOCUMENTS 6,377,230 B1     4/2002  Yamazaki et al.
6,535,241 B1 *   3/2003  McDowall ......... G02B 27/0093
                                                    348/43
(Continued)

OTHER PUBLICATIONS

Silicon Graphics, Inc., Multi-Channel Option Programmer's Guide (Document No. 007-1812-030 / Published: Sep. 15, 1994), Chap. 1.*

(Continued)

*Primary Examiner* — Zhitong Chen
(74) *Attorney, Agent, or Firm* — Panitch Schwarze Belisario & Nadel LLP (57) ABSTRACT

In order to allow a plurality of stereoscopic image sequences to be represented with comparatively good image quality, a method is provided which comprises the following method steps: i. receiving at least two sequences of multi-colored images in parallel; ii. breaking down each image into the basic colors thereof; iii. parallel processing the parts of an image that have been broken down into the basic colors in at least one respective data channel per basic color; iv. simultaneously displaying all parts of an image that have been broken down into the basic colors, wherein sequentially the images of different image sequences follow each other. A circuit assembly that can be used in this context is characterized by at least two signal inputs, wherein each signal input is used as an input for the image signals of an image sequences to be represented and the image signals are based on at least three basic colors, at least one signal output per basic color, wherein the basic color of a signal input is associated with at least one signal output, and a sorting unit, in which the image signals of the image signals that are essentially received via the different signal inputs are broken down into the basic colors thereof and sorted such, at each of the signal outputs, the received signals of a basic color of (Continued)

all signal inputs that are associated with the respective signal output are output.

14 Claims, 4 Drawing Sheets

(52) U.S. Cl.
CPC ..... *H04N 13/0438* (2013.01); *H04N 13/0459* (2013.01); *H04N 2013/0465* (2013.01)

(56) References Cited

U.S. PATENT DOCUMENTS

2007/0097017 A1* 5/2007 Widdowson ........... G09G 3/002
 345/1.3
2009/0303384 A1 12/2009 Inoue et al.

OTHER PUBLICATIONS

McDowall, Ian E., Mark T. Bolas, Dan Corr, and Terry C. Schmidt. "Single and multiple viewer stereo with dlp projectors." In Photonics West 2001—Electronic Imaging, pp. 418-425. International Society for Optics and Photonics, 2001.*
International Preliminary Report on Patentability issued in PCT/EP2011/064830, dated Mar. 5, 2013.
International Search Report and Written Opinion issued in PCT/EP2011/064830, dated Oct. 26, 2011 with English translation of International Search Report.

* cited by examiner

Normally closed diaphragm (NC)

Normally open (NO)

Combined NO and NC diaphragm

Fig. 7

METHOD FOR REPRESENTING A PLURALITY OF IMAGE SEQUENCES

CROSS-REFERENCE TO RELATED APPLICATIONS

This application is a National Stage of PCT International Application No. PCT/EP2011/064830, filed on Aug. 29, 2011, and claims priority of German Patent Application No. 10 2010 037 256.0, filed on Aug. 31, 2010. The disclosures of the aforementioned applications are incorporated herein in their entirety by reference.

The invention relates to a method for representing a plurality of multicoloured image sequences for at least two observers, wherein a first image sequence intended for one observer is different from a further image sequence intended for another observer, in which the colours of image points of the images of the image sequences are mixed of at least three basic colours and the image sequences are displayed with at least one image reproduction device.

Such methods are used in particular in the representation of virtual worlds in spaces such as for example a CAVE (Cave Automatic Virtual Environment), in which a plurality of observers simultaneously move and simultaneously observe one or a plurality of objects that are reproduced to them from an observation angle corresponding to their location. The projection of the virtual world is performed by means of stereoscopic images, which are calculated individually by computers in real time for each observer.

Various methods exist, in particular active and passive stereoprojection, for the stereoscopic representation of images.

In passive projection the first and the second image of a stereoscopic image pair are simultaneously represented on a projection wall, wherein each of the images is orthogonally polarised and the projection wall leaves the polarisation of the images unchanged. The images are separated by means of filters, for example polarisation filters. The observer wears spectacles with corresponding filters, in order to perceive in each case one of the two images with each of his eyes. This method is suitable in particular for large groups of observers, since the spectacles needed for this purpose can be produced extremely conveniently from paper and two polarisation filter foils.

Another approach to passive stereoprojection consists in slightly altering in one of the two images of an image pair the colours in relation to the colours of the other image.

A further possibility of passive image channel separation in representing stereoscopic image pairs consists in using different wavelengths as a basis for the image representation of two images at the same time. If suitable wavelength-based filter lenses are used, then simply the wavelengths of one image pass through one spectacle lens, while the wavelengths of the other image pass through the other spectacle lens, so that the observer sees both images of an image pair simultaneously.

In active projection technology the two images of an image pair are represented sequentially, i.e. chronologically one after the other. To observe both images shutter spectacles are used, which alternately shut off the view for in each case one eye in the image change cycle, so that one eye of the observer always perceives one of the images of an image pair, while the other eye in each case perceives the other image of the image pair. In order to be able to perceive the images in a flicker-free manner, high image repetition rates are necessary for this purpose.

If one wishes to project stereoscopic images for various observers simultaneously in a space, such as for example a CAVE, for example in order to represent for all observers the same virtual object in the space, but for each observer from the viewing angle that corresponds to the location of the respective observer, then the projected image pairs for each of the observers must be able to be distinguished or filtered out from those of the other observers. This can be achieved for example by combining various of the aforedescribed methods with one another. A combination of various methods impairs the image quality however. Accordingly a system that is based on only one of the aforedescribed methods would be desirable. If however a projection system is devised that is based on different polarisation angles, so as to allow a separation of an image pair for one observer from the image pairs for other observers, this is also subject to a serious disadvantage, since the observation angles of each user are significantly restricted.

A conventional approach for representing various stereoscopic images for different observers, for example for projecting a virtual object, could consist in using a plurality of projectors. For example, six projectors could be used for six successive images, in which a shutter screen is placed in front of each projector. Each screen is briefly opened once in the circulation method so as to release an image of the projector standing behind it, and is closed at the times at which one of the other screens is open. The lenses of a pair of shutter spectacles are in each case correspondingly opened in order to allow the image to reach the associated eye. Obviously such a projection system is both technically complicated and also difficult to manipulate.

A 3-chip DLP projector currently provides the greatest computing power for representing stereoscopic images for several observers, but can only represent two alternating images with an image repetition rate of 110 Hz. The signal path in such a projector is shown by way of example in FIG. 1. A signal input is provided, via which the sequentially respective right and left partial images of a stereoscopic image sequence can be received. The signal input is connected to a scaler 2, in which the right and left partial images are broken down in succession into their basic colours red, green and blue (RGB). For each of the basic colours a drive circuit $3_R$, $3_G$, $3_B$ is respectively connected downstream of the scaler 2, which drives the three DMD chips that are used to display the red, green and blue parts of a partial image and are contained in the optical unit 4. Each of the drive circuits $3_R$, $3_G$, $3_B$ receives, in addition to the colour data from the scaler 2, a synchronisation signal via which the data passed on to the DMD are synchronised. On account of the two signal inputs for the two stereoscopic partial images the number of displayed (partial) images is restricted. Each signal input is split into its three colour components R, G and B, which are processed independently of one another. There is no possibility of processing more than one (partial) image at the same time.

An object of the present invention is therefore to provide a method of the type mentioned in the introduction, which permits a representation of a plurality of stereoscopic images in a comparatively good image quality. A further object of the present invention is to provide a circuit arrangement with which the method according to the invention can be implemented.

This object may be achieved with a method having the features as may be found in the various claims, as well as with a circuit arrangement having the features as may be found in the various claims.

An image sequence is understood here and hereinafter to mean in particular one that transmits to an observer a changeable or moving image, in particular the representation of virtual objects in a virtual space, whose projected views alter for an observer depending on his position.

The display of image sequences is understood in particular to mean the projection of image sequences on one or a plurality of projection screens, but also the display of image sequences on image screens or electronic image boards, insofar as they allow a suitable image repetition rate (for example displays based on the OLED technology).

Basic colours are understood to mean the basic colours of a colour space, in particular the colours red, green, blue under additive colour mixing or the colours cyan, yellow, magenta (CYM), optionally in combination with black, under subtractive colour mixing. Other combinations of basic colours are however also feasible.

An image in the sense of the present description consists of a plurality of image points, in which the colour value of each image point is described by the respective intensity of the basic colours.

The method according to the invention is characterised by the following steps:
  i. Receiving at least two sequences of multicolour images in parallel;
  ii. Breaking down each of the images into its basic colours;
  iii. Parallel processing of the parts of an image that have been broken down into the basic colours in each case at least one data channel per basic colour;
  iv. Simultaneously displaying all parts of an image broken down into the basic colours, in which the images of different image sequences follow one another sequentially.

In other words, an essential part of the invention is to break down the colour information of the image sequences received in parallel into the basic colours and then process the information in particular digitally in separate data channels, in order then to display again collectively the individual basic colour parts of the images, wherein images of different image sequences are then displayed sequentially in a changing manner. In this connection the images of two paired image sequences can be the partial images of stereoscopic images of a stereoscopic image sequence.

By breaking down the images into the basic colours it then becomes possible to process sequentially a plurality of image sequences, whose signals are received in parallel, in a slim parallel data processing structure with one data processing channel per basic colour for single image sequences, or two data processing channels per basic colour for stereoscopic image sequences.

In order to generate a substantially flicker-free image, simply the display duration per image has to be appropriately shortened, so that for each image sequence an image is represented with a frequency of about 60 Hz. For example, the display duration with six image sequences to be displayed in parallel—this corresponds for example to three stereoscopic image sequences for the three observers—can be 1/360 second for each image. The shorter the display duration of an image, the lower the brightness with which the image is perceived. This deficiency can easily be compensated by adapting the brightness of the image display. This however does not cause any insuperable and therefore significant damage to the image quality.

In a particular modification of the method according to the invention the partial images of a stereoscopic images are represented in sequence directly one after the other. Alternatively, also firstly all right partial images of all stereoscopic image sequences can be represented sequentially after one another, and then the associated left partial images of all stereoscopic image sequences.

The method according to the invention allows the use of 1-chip DLP projectors for projecting different image sequences for a plurality of observers, wherein at least one 1-chip DL projector is used for each basic colour, so that the limitations of such a projector as regards the synchronisation of the image change are avoided with the colour changes predetermined by the colour wheel of such a projector. Also, due to the parallel processing of the individual signal constituents the restrictions occurring in a conventional 3-chip DLP projector due to the use of a scaler processing the whole image content are avoided, so that the method can of course also be used on a 3-chip DLP projector provided the hardware is suitably adapted.

The invention may also be solved by a circuit arrangement, which is characterised by
  at least two signal inputs, each of which serves as an input for the image signals of an image sequence to be represented and the image signals are based on at least three basic colours,
  at least one signal output per basic colour, wherein the basic colour of a signal input is associated with at least one signal output,
  a sorting unit, in which the image signals of the image signals that are substantially received by the different signal inputs are broken down into their basic colours and are sorted so that at each of the signal outputs the received signals of a basic colour of all signal inputs, that are associated with the respective signal output, are output.

The circuit arrangement according to the invention serves to receive various image sequences in parallel and to break down the received image information into its basic colour information and to output the information, sorted according to basic colours, via the signal outputs.

Preferably the image signals are processed in parallel at least in terms of image points at the latest after they are received via a signal input, and the sorted image signals are present, sorted according to basic colour, at least directly before the respective signal output, so that all basic colour information that is to be output via a signal output, of all signal inputs that are associated to the signal output for the same image point, is present in parallel. Thus, for example, with a colour depth of 24 bits in RGB the colour information at an image point of an image is broken down into its basic colour information (8 bits red, 8 bits green, 8 bits blue). The basic colour information of the same image point is then reassembled at the various basic colour channels into 24 bit data packets, namely 8-bit red of an image point of an image of a first image sequence, 8-bit red of the same image point of an image of a second image sequence and 8-bit red of the same image point of an image of a third image sequence. The corresponding procedure occurs at the data channels for the colours green and blue. In this connection it is not important whether the data are transmitted to the signal inputs and outputs themselves in series, as for example with DVI interfaces, or in parallel. The advantage of parallel data processing within the circuit arrangement according to the invention is that the colour data bits can be processed rapidly and efficiently in parallel in FPGAs.

The circuit arrangement according to the invention can for example be connected upstream of a number of projectors, each of which projectors serves to represent the partial images in respectively one of the basic colours, wherein at least the projectors should be synchronised with one another so that they actually display simultaneously in each case the partial images of the same image.

The circuit arrangement can however also be integrated in a projector, for example a 3-chip DLP projector.

The circuit according to the invention can be configured so that the data processing channels are used in pairs for processing stereoscopic image sequences. In this connection it should be ensured that the signal inputs are identified so that it becomes clear to a user that they in each case serve as the right and left signal input for a stereoscopic image sequence, so that in the subsequent data processing and synchronisation it is clear that two image sequences are actually coherent stereoscopic image sequences. This is important for example for separating the image displays at the observer, in particular if shutter spectacles are used, which have to be controlled so that the lenses of a spectacles open exactly when the right or left partial image specific for the observer are displayed.

For the display of stereoscopic image sequences the circuit arrangement preferably has in each case a first and a second signal output per basic colour, wherein at the first signal output per basic colour all right partial images of various image sequences received via the signal inputs are output, and at the second signal output per basic colour all left partial images of various image sequences received via the signal inputs are output. In this way the output signals can be processed immediately in parallel and bottle-necks in the data processing are avoided. Of course, it is just as possible to output the right and left partial image in sequence via a data channel associated with the basic colour.

In addition a projector system according to the invention for the parallel display of various image sequences for different observers is characterised in that it has two parallel signal processing sections for each basic colour, which are fed with signals from the aforedescribed circuit arrangement.

The invention is described in detail hereinafter with the aid of figures which illustrate by way of example partial aspects of the invention.

Figure 1:
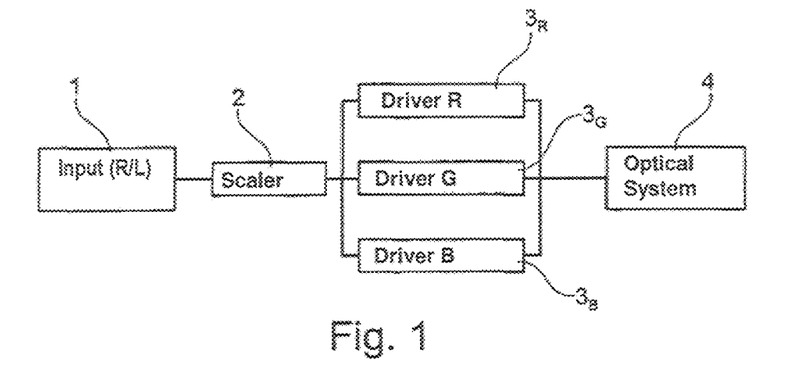
FIG. 1 is a circuit diagram for a 3-chip DLP projector previously known from the prior art.

The circuit diagram of a previously known 3-chip DLP projector illustrated in FIG. 1 has already been discussed in the introduction.

Figure 2:
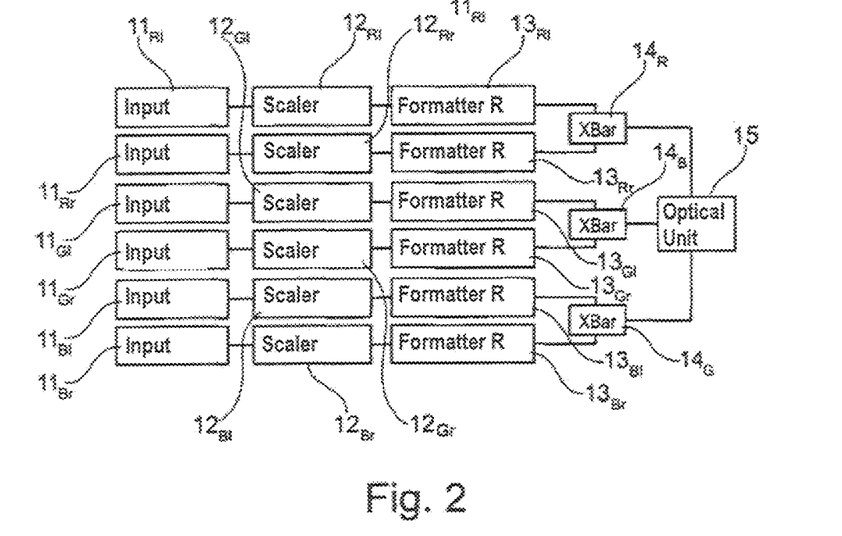
FIG. 2 is a circuit diagram for a 3-chip DLP projector according to the present invention.

FIG. 2 now shows a circuit diagram of a 3-chip DLP projector according to the invention that is able to display substantially in parallel various images for various observers. In contrast to a conventional 3-chip DLP projector it has six signal inputs $11_{Rr}$, $11_{Rl}$, $11_{Gr}$, $11_{Gl}$, $11_{Br}$, $11_{Bl}$, namely in each case two signal inputs for each of the basic colours RGB, wherein in each case one of the two signal inputs $11_{Rr}$, $11_{Gr}$, $11_{Br}$, receives the basic colour information of the right partial image and the respective other of the two signal inputs $11_{Rl}$, $11_{Gl}$, $11_{Bl}$ receives the basic colour information of the left partial image of a stereoscopic image. Each of the signal inputs is in each case connected to a downstream scaler $12_{Rr}$, $12_{Rl}$, $12_{Gr}$, $12_{Gl}$, $12_{Br}$, $12_{Bl}$ in the signal flow direction, which prepares the received signals and passes them to a downstream-connected driver arrangement $13_{Rr}$, $13_{Rl}$, $13_{Gr}$, $13_{Gl}$, $13_{Br}$, $13_{Bl}$, in which the data are prepared for reproduction on one of the three DMD chips of the DLP projector.

The right and left partial images of a basic colour are passed to a DMD chip of the DLP projector in sequence from the respective driver arrangement $13_{Rr}$, $13_{Rl}$, $13_{Gr}$, $13_{Gl}$, $13_{Br}$, $13_{Bl}$ via a switching device $14_R$, $14_G$, $14_B$ to the DMD chip associated with the basic colour and forming a constituent of an optical system 15, wherein all three colour constituents of a partial image are fed simultaneously and synchronously to the optical system.

Thus, a plurality of stereoscopic images can be displayed one after the other, wherein the display of a sequence of images with shutter spectacles of different observers can be synchronised so that each observer sees only the images intended for him. For example, a sequence of respectively six successive projected images can be synchronised with the shutter spectacles so that a first observer always sees only the first of the sequences of six images, the second observer sees only the second image, and so on.

Figure 3:
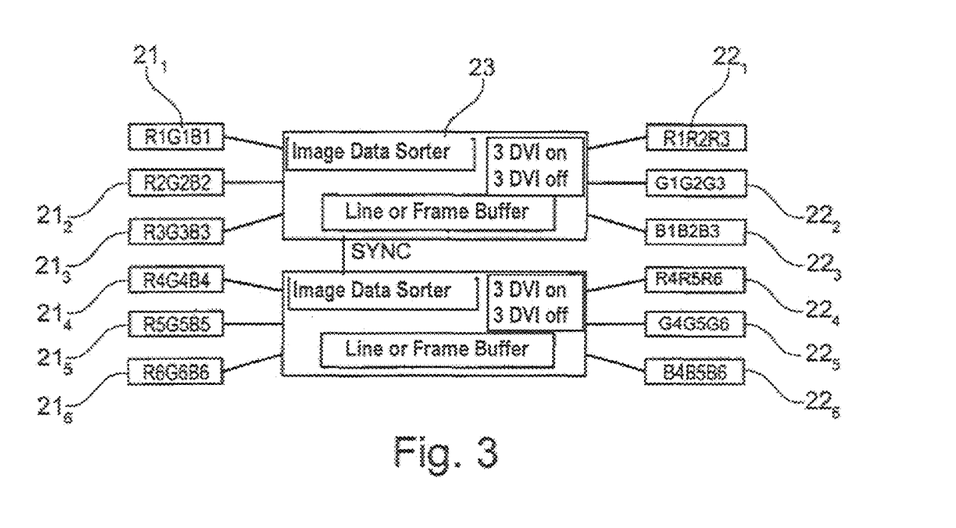
FIG. 3 is a function diagram for a circuit according to the invention for sorting the image data of various images to be projected.

FIG. 3 shows a function diagram for a circuit arrangement according to the invention for a projector system. It has six signal inputs, $21_1$, $21_2$, $21_3$, $21_4$, $21_5$, $21_6$ as well as six signal outputs $22_1$, $22_2$, $22_3$, $22_4$, $22_5$, $22_6$, which are connected to one another by a sorting and buffer circuit. The signal data $R_iG_iB_i$ (the index i stands for the number of the signal input) are decomposed therein into their constituents $R_i$, $G_i$, $B_i$ and are redistributed to the signal outputs, wherein the signals $R_1$, $R_2$, $R_3$ are fed in parallel to the signal output $22_1$, the signals $G_1$, $G_2$, $G_3$ in parallel to the signal output $22_2$, the signals $B_1$, $B_2$, $B_3$ in parallel to the signal output $22_3$, the signals $R_4$, $R_5$, $R_6$ in parallel to the signal output $22_4$, the signals $G_4$, $G_5$, $G_6$ in parallel to the signal output $22_5$, and the signals $B_4$, $B_5$, $B_6$ in parallel to the signal output $22_6$. If the circuit arrangement is to be used to transmit stereoscopic image sequences, then the right and left partial images can be applied for example to the signal inputs $21_1$ and $21_4$, $21_2$ and $21_5$ as well as $21_3$ and $21_6$.

This exemplary circuit arrangement can be connected upstream of the circuit diagram illustrated in FIG. 2, so that the signal output $22_1$ is connected to the signal input $11_{Rr}$, the signal output $22_2$ to the signal input $11_{Rl}$, the signal output $22_3$ to the signal input $11_{Gr}$, the signal output $22_4$ to the signal input $11_{Gl}$, the signal output $22_5$ to the signal input $11_{Br}$, and the signal output $22_6$ to the signal input $11_{Bl}$. Three different stereoscopic image sequences can then be projected in parallel for different observers with such a circuit.

Figure 4:
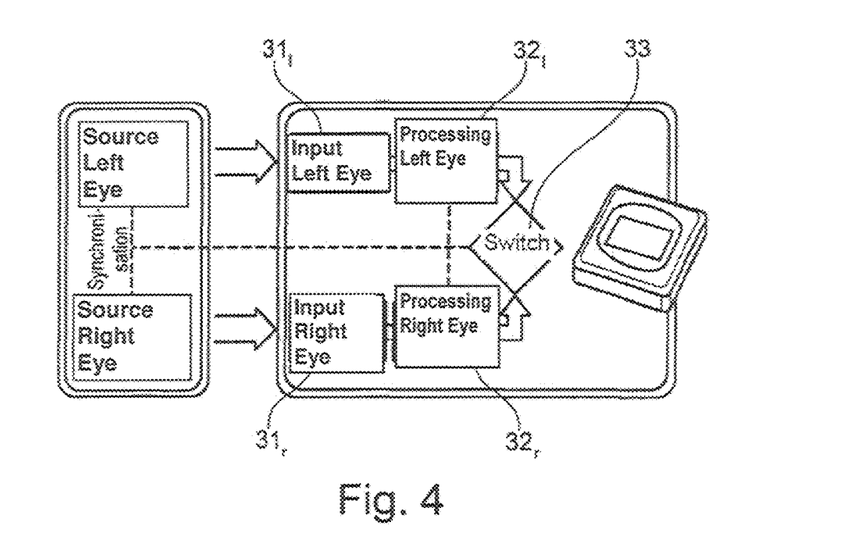
FIG. 4 is a function diagram for a 1-chip DLP projector previously know from the prior art.

Alternatively, also three 1-chip DLP projectors can be operated with the circuit arrangement illustrated in FIG. 3, whose function scheme is shown in FIG. 4. Each of these 1-chip DLP projectors is used to project the images of the different image sequences in each case in one of the basic colours. Each of the 1-chip DLP projectors has two signal inputs $31_R$, $31_l$ for the right and left partial images of stereoscopic images in one of the basic colours. The partial images are processed in parallel in the driver circuits $32_R$, $32_L$ and are passed via a change-over switch 33 to the DMD chip of the projector, the image data processing in the driver circuits being synchronised by an external timing signal. The colour wheel of such a 1-chip DLP projector no longer has to rotate and can be replaced by a monochromatic colour wheel, so that the restrictions of the timing of image changes predetermined by the colour change of a rotating colour wheel are avoided.

Figure 5:
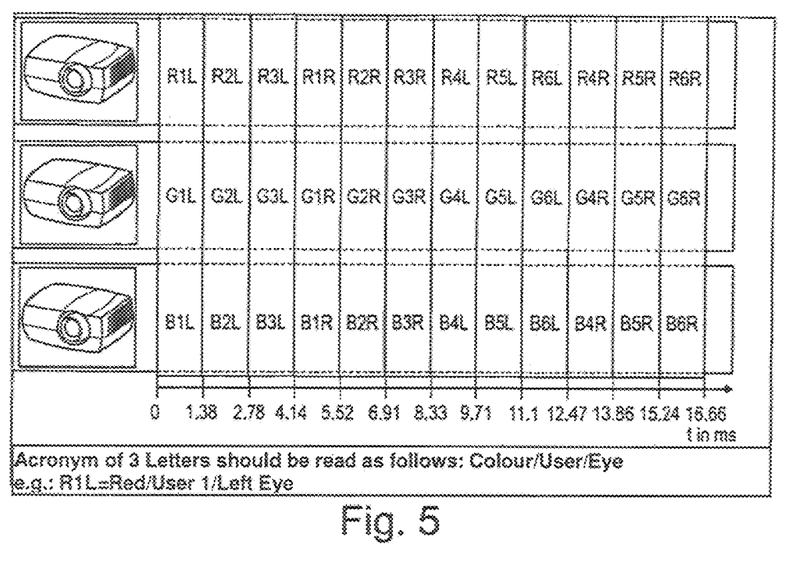
FIG. 5 is a diagram of the sequence of images displayed by three 1-chip DLP projectors over a period of time.

FIG. 5 illustrates the sequence of various images that are projected in parallel by three projectors, wherein the first projector 41 simply reproduces the red portion, the projector 42 the green portion and the projector 43 the blue portion of the images. As first image the left partial image of a first stereoscopic image sequence is projected in the colours red, green and blue (R1L, G1L, B1L), followed by the left partial image of a second stereoscopic image sequence in the colours red, green and blue (R2L, G2L, B2L) and then the left partial image of a third stereoscopic image sequence, also in the colours red, green and blue (R3L, G3L, B3L). Following this the respective right partial images of the first, second and third stereoscopic image sequences are correspondingly projected in the sequence (R1R, G1R, B1R), (R2R, G2R, B2R), (R3R, G3R, B3R). This is then correspondingly followed by the display of the right and left partial images of a fourth, fifth and sixth stereoscopic image sequence in the order (R4L, G4L, B4L), (R5L, G5L, B5L), (R6L, G6L, B6L), (R4R, G4R, B4R), (R5R, G5R, B5R) and (R6R, G6R, B6R). Each image is displayed for a duration of 1.38 ms, i.e. 1/720 second, and all partial images are displayed within a period of 1/60 second. Thus, different stereoscopic image sequences are displayed simultaneously to six observers.

From the image sequence illustrated from FIG. 5 it can be seen that stereoscopic image sequences are represented with three projectors 6. In order to achieve this with conventional projectors, whose image data processing is timed at a frequency of 60 Hz, either a circuit diagram modified in relation to FIG. 2 can be used, in which instead of six signal inputs twelve inputs are used, namely four for red image data, four for green image data and four for blue image data, in each case a scaler and a driver circuit being connected to the signal inputs, wherein then all four driver circuits are connected via a change-over switch to the DMD chip of the optical system associated with the respective basic colour, so that four different partial images of a colour can be displayed one after the other in sequence. The twelve inputs can then be supplied by two of the circuit arrangements illustrated in FIG. 3.

If the timing frequency of the image-processing elements in the projector is high enough, the same result can also be achieved with the circuit diagram of FIG. 2, if for example (partial) images of two (stereoscopic) image sequences follow one after the other in sequence in the inputs.

Another variant consists in splitting a data packet of for example 10 bits, which normally contains the data for a basic colour of an image point, into two data packets each of 5 bits, in which is contained the colour information of a basic colour of two image points. This splitting of the data packet would then have to take place at a suitable point in the driver circuit of the data channel, so that first of all one part of the data packet is available to the change-over switch for displaying a first partial image, and then the second part of the data packet becomes available for displaying the second partial images.

In all embodiments an external timing signal can be made available for example by a timing generator, which controls the synchronous image data processing both in the circuit arrangement illustrated in FIG. 3 and also in the projectors and if necessary in the signal sources (for example computers), or also predetermines the timing of the shutter spectacles used by observers.

Figure 6:
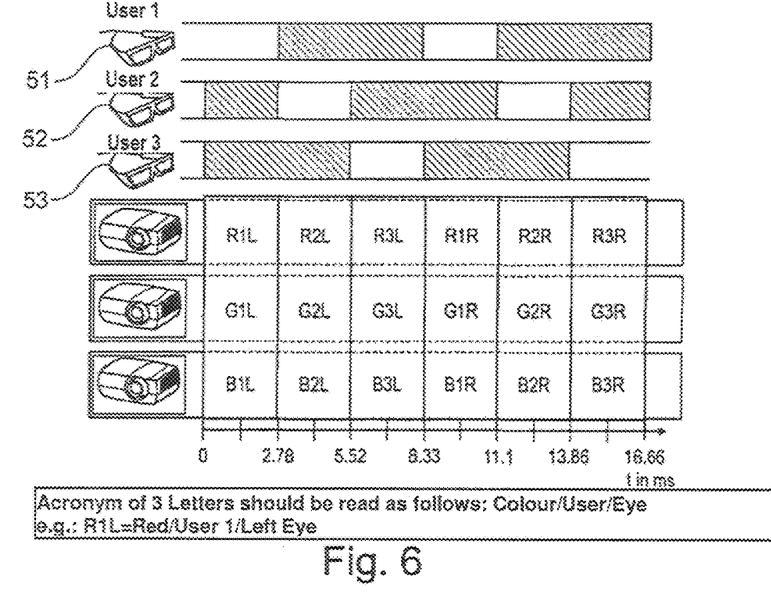
FIG. 6 is a diagram for the switching of shutter spectacles of a plurality of users synchronously with the image display.

FIG. 6 shows with the aid of a projection of three different stereoscopic image sequences for three observers how the shutter spectacles should be synchronised with the image sequence. It can clearly be seen that the left lens of the first shutter spectacles 51 is transparently switched for the duration of the display of the left partial image (R1L, G1L, B1L) of a first stereoscopic image sequence, followed by the left lens of the second shutter spectacles 52 for the duration of the display of the left partial image (R2L, G2L, B2L) of a second stereoscopic image sequence, and then the left lens of the third shutter spectacles 53 for the duration of the display of the left partial image R1L, G1L, B1L) of a third stereoscopic image sequence. The right lenses of the shutter spectacles 51, 52, 53 are then correspondingly transparently switched in each case for the duration of the display of the corresponding right partial images (R1R, G1R, B1R), (R2R, G2R, B2R), (R3R, G3R, B3R). For the synchronisation each of the shutter spectacles is triggered with another code, so that the synchronisation signals are different for each of the shutter spectacles and a synchronisation of a pair of shutter spectacles independent of other shutter spectacles is possible.

Figure 7:
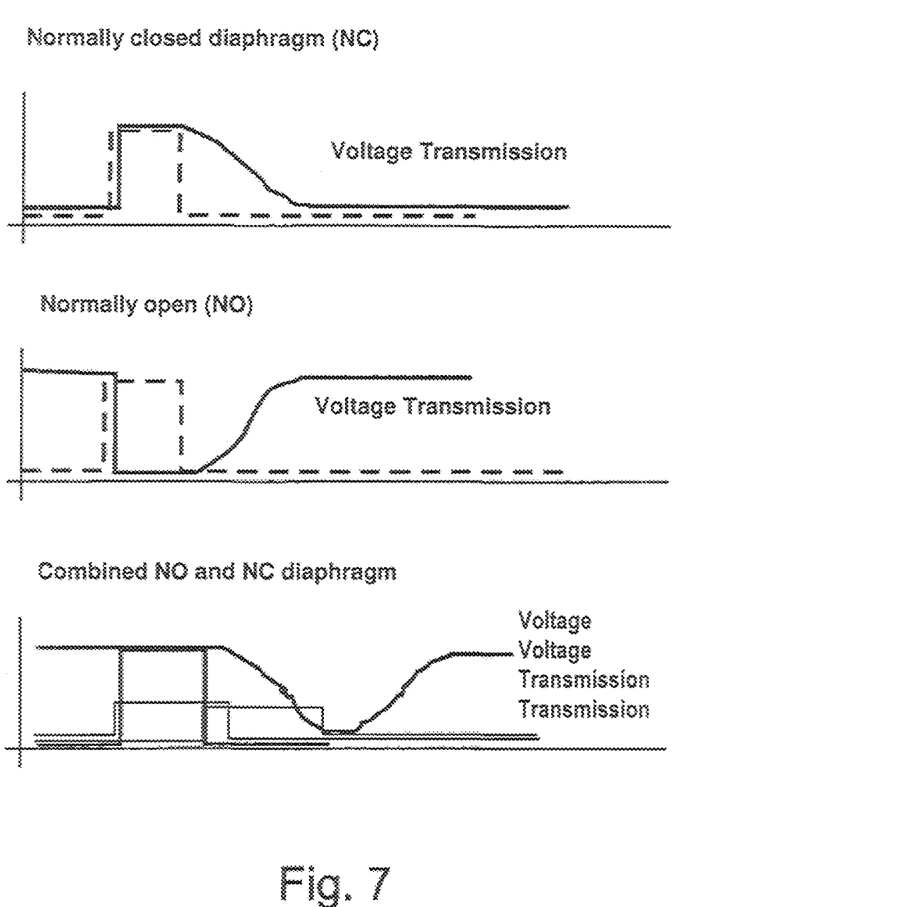
FIG. 7 is a diagram of the signals used according to the invention for a rapid switching of shutter spectacles.

In order to separate different parallel image sequences from one another for different observers, rapidly switching shutter spectacles can be used, whose lenses consist of two liquid crystal surfaces (one each for the left and right eye), which can be electronically switched between transparent and opaque. The signal path and the transparency associated therewith of conventional and rapidly switching shutter lenses are shown in FIG. 7. Whereas the liquid crystal surfaces react quickly when they are switched on and thus their transmissibility switches from opaque to transparent or from transparent to opaque, they react very slowly when the voltage is disconnected and they revert to their original state from transparent to opaque or from opaque to transparent (see the two upper diagrams in FIG. 7). This is not a problem if the display of an image of an image sequence is displayed for a sufficiently long time. If the image change rate is high however, because different users wish to see different image sequences in parallel and flicker-free on the same display or projection surface, the slow resetting of the lenses leads to problems since the observer happens to see parts of an image sequence that is intended for another observer. In order to solve this problem each lens of the shutter spectacles can be formed from two liquid crystal surfaces arranged behind one another, one of which is transparent in the unswitched state and the other is opaque in the unswitched state. If such a lens is to be transparent, a voltage is applied to the opaque liquid crystal surface, which then immediately becomes transparent. If the lens should be opaque, a voltage is applied to the transparent liquid crystal surface, which then immediately becomes opaque. At the same time or shortly thereafter the originally opaque liquid crystal surface can be switched off. When the latter liquid crystal surface is completely opaque again, the originally transparent liquid crystal surface can also be switched off, so that it becomes transparent again, the lens continuing to remain opaque (see lower diagram in FIG. 7).

The examples of the invention or parts thereof described here are purely exemplary and are not intended to restrict the scope of the claims. In particular, the described invention is not restricted to the use of DLP projectors, even though the projection technique used therein, and based on micromirrors, is particularly suitable for the projection of rapid image changes. In principle, the invention can also be used for the parallel projection of various (stereoscopic) image sequences with any other type of projectors, for example LCD beamers, but also for the display of a plurality of parallel (stereoscopic) image sequences with suitable screens/display panels. If DLP projectors are employed the use of scalers can also be avoided, in particular if the image data made available to the signal inputs are adapted as regards image resolution, image brightness and/or image repetition frequency, to the image processing possibilities of the projector.

What is claimed is:

1. A method for representing a plurality of multi-coloured image sequences, for at least two observers, wherein a first image sequence intended for a first observer is different from a further image sequence intended for another observer, in which the image sequences are projected onto one or more projection screens with at least one digital light processing (DLP) projector, the method including:
  i. receiving at least two sequences of multi-coloured images, for at least two respective observers, as digital data in parallel;
  ii. breaking down respective images of the at least two sequences of multi-coloured images received in parallel as digital data into basic colours;
  iii. providing the digital data of respective components of a respective one of the at least two sequences of multi-coloured images broken down into basic colours, the digital data of respective components being sorted image point-wise and provided in data packets, each data packet comprising the colour data of one colour of a single image point, respectively, of each of the respective images received in parallel of the at least two image sequences;
  iv. parallel processing corresponding data packets of image points of images received in parallel of the at least two image sequences in at least one data channel per respective basic colour; and
  v. simultaneously displaying all the components of the respective image broken down into basic colours with the at least one DLP projector, wherein images of different image sequences follow one another in sequence.

2. The method according to claim 1, wherein the images of two image sequences pair-wise are the partial images of stereoscopic images of a stereoscopic image sequence.

3. The method according to claim 2, wherein the partial images of a stereoscopic image are represented directly one after the other in sequence.

4. The method according to claim 2, wherein, firstly, the first partial images of the stereoscopic images of at least two stereoscopic image sequences are displayed, and then, in each case, second partial images of these images of these image sequences are displayed.

5. The method according to claim 1, wherein each case at least one DLP projector is used to represent each of the basic colours of an image.

6. The method according to claim 1, wherein all basic colours are represented by a single DLP projector.

7. The method of claim 1, wherein the number of data packets for a respective image point corresponds to the number of basic colours.

8. The method of claim 1, wherein a number of bits of each data packet is the same as a size of the colour information for an image point of an image of one of the image sequences.

9. A circuit arrangement for a projector system, including:
  at least two signal inputs, each of which is configured as a digital signal input for image signals of an image sequence to be represented, wherein the image signals are based on at least three basic colours,
  at least one signal output per basic colour, wherein the basic colour of a signal input is associated with at least one signal output, and
  a sorting unit configured to break down the image signals of the image sequences that are received via the various signal inputs into data bits corresponding to the basic colours and to sort the data bits so that, at respective ones of the signal outputs, there are output the received signals of a basic colour of all signal inputs that are associated with the respective signal output, wherein the data bits of one colour are provided in a data packet, respectively, and wherein each data packet comprises the colour data of one respective image point of images received in parallel at the at least two signal inputs.

10. The circuit arrangement according to claim 9, further comprising at least one signal processing arrangement configured to process the image signals in parallel at least image point-wise after they are received via a signal input, or prior thereto, wherein the sorted image signals sorted according to basic colours are present at least directly before the respective signal output, so that all basic colour information that is to be output via a signal output, of all signal inputs that are associated to the signal output for the same image point, is present in parallel.

11. The circuit arrangement according to claim 9, wherein, in each case, two signal inputs comprise signal inputs for right and left partial images of a stereoscopic image sequence.

12. The circuit arrangement according to claim 11, wherein, in each case, a first and a second signal output are provided for a respective basic colour, wherein at the first signal output for the respective basic colour, all right partial images of various image sequences received via the signal inputs are output, and wherein at the second signal output for the respective basic colour, all left partial images of various image sequences received via the signal inputs are output.

13. A projector system for the parallel display of various image sequences for different observers, comprising:
  the circuit arrangement according to claim 9; and
  for a respective basic colour, two parallel signal processing sections, which are supplied with signals from the circuit arrangement according to claim 9.

14. A method of representing a plurality of multi-coloured image sequences, in particular for at least two observers, wherein an image sequence intended for an observer is different from a further image sequence intended for another observer, and wherein the images of two image sequences pair-wise are partial images of stereoscopic images of a stereoscopic image sequence, in which the image sequences are projected onto one or more projection screens with a projection system comprising at least one digital light processing (DLP) projector, the method comprising:
  i. receiving at least two sequences of multi-coloured images in parallel as digital data;
  ii. breaking down each of the images received in parallel as digital data into basic colours;
  iii. providing the digital data of respective components of a respective one of the at least two sequences of multi-coloured images broken down into basic colours, the digital data of respective components being sorted image point-wise and provided in data packets, each data packet comprising the colour data of one colour of a single image point, respectively, of each of the respective images received in parallel of the at least two image sequences;

iv. parallel processing parts of a respective image broken down into the basic colours in each case in at least one data channel per basic colour in a circuit arrangement of the projection system, the projection system including, for each basic colour, two parallel signal processing sections having a first signal output and a second signal output per basic colour, wherein at the first signal output only right partial images of various image sequences are output, and wherein at the second signal output only left partial images of various image sequences are output; and v. simultaneously displaying all parts of a respective image broken down into the basic colours with the at least one DLP projector, wherein the images of different image sequences follow one another in sequence.

\* \* \* \* \*